United States Patent [19]

Horzepa

[11] Patent Number: 5,441,115

[45] Date of Patent: Aug. 15, 1995

[54] EDGING BLADES FOR CONSTRUCTING BEVELLED AND ANGLED CONTOURS FOR LANSCAPING PURPOSES

[76] Inventor: John J. Horzepa, 4123 Manor House Dr., Marietta, Ga. 30062

[21] Appl. No.: 88,754

[22] Filed: Jul. 8, 1993

[51] Int. Cl.⁶ ............................................. A01D 34/84
[52] U.S. Cl. ....................................... 172/15; 30/276; 30/347; 30/DIG. 5
[58] Field of Search ...................... 172/13, 15; 30/347, 30/276, DIG. 5; 56/255, 256, 295, 289, DIG. 17

[56] References Cited

U.S. PATENT DOCUMENTS

| | | |
|---|---|---|
| 2,139,353 | 9/1937 | Bruder . |
| 2,555,441 | 9/1947 | Hackney . |
| 2,630,747 | 3/1949 | Mintz ........................... 172/15 |
| 2,664,807 | 2/1950 | Hedrick . |
| 2,725,813 | 5/1951 | Stoeber . |
| 2,737,105 | 3/1956 | Wilson . |
| 3,174,224 | 3/1965 | Rousselet ...................... 172/15 X |
| 3,938,249 | 2/1976 | Chacon ......................... 172/15 X |
| 4,979,573 | 12/1990 | Williamson . |

FOREIGN PATENT DOCUMENTS 123791 12/1959 U.S.S.R. .

Primary Examiner—Randolph A. Reese
Assistant Examiner—Christopher J. Novosad
Attorney, Agent, or Firm—James A. Hinkle

[57] ABSTRACT

A bevelled edger blade has a base side attachable centrally to a conventional edger shaft. Ends of the base side having cutting edges are extended an equal distance in opposite directions from a blade axis at a central attachment orifice on the base side to vertical corners. An axial corner is positioned a select distance horizontally from the blade axis. Sloped edges of border channels of landscape areas are cut by cutting edges on angular sides intermediate the axial corner and the vertical corners on the three-sided edger blade as it is rotated by the conventional edger shaft. The angular sides can be straight for cutting straight slopes or arcuate for cutting arcuate slopes optionally. A blade brace can be positioned parallel to the base side between the angular sides. The vertical corners can be angled acutely for cutting landscape channels with acute angles between a straight surface and an opposite side. The vertical corners also can be rounded for round-bottomed edging or squared for cutting square bottoms of landscape channels. Deflector surfaces on rotationally aft edges of the sides of the blade can be provided for directing flow of cuttings out of the edging channels in a desired direction for collection or dispersement.

13 Claims, 2 Drawing Sheets

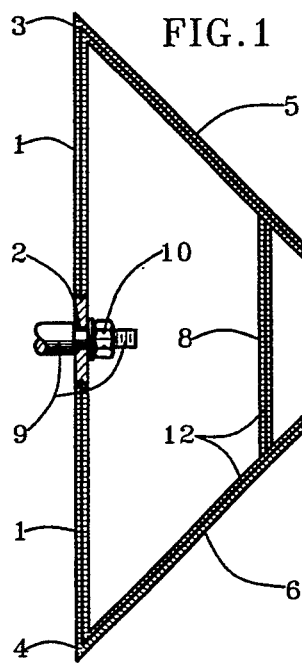
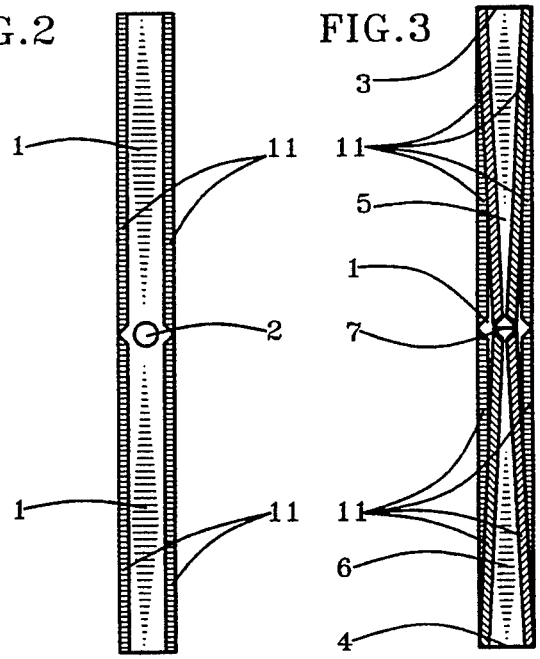
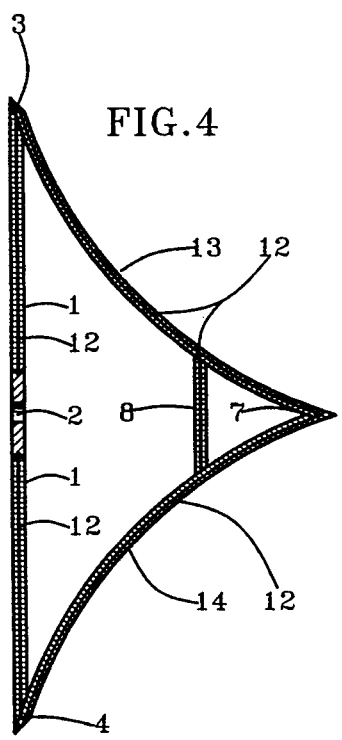
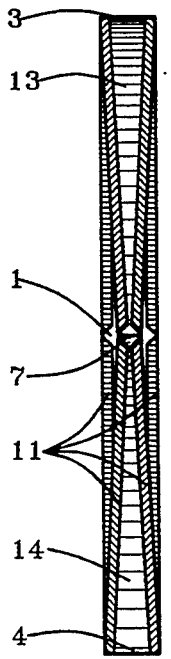
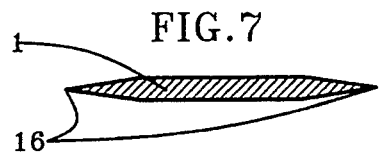
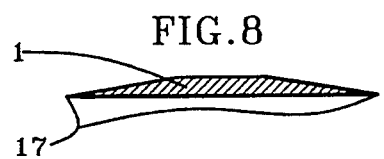
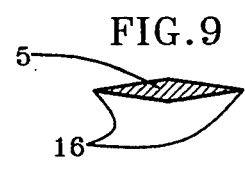

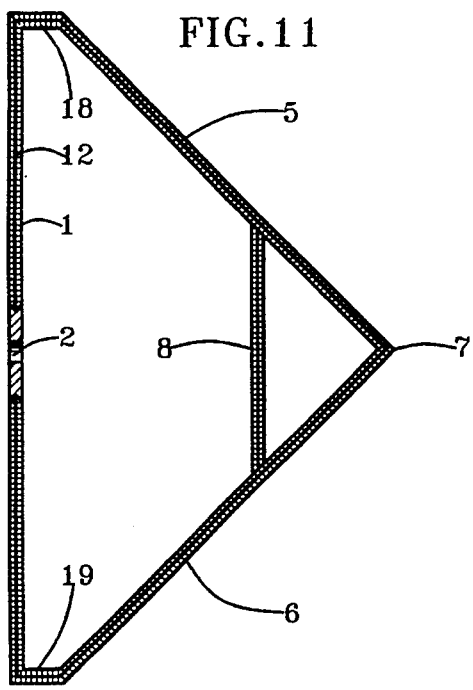
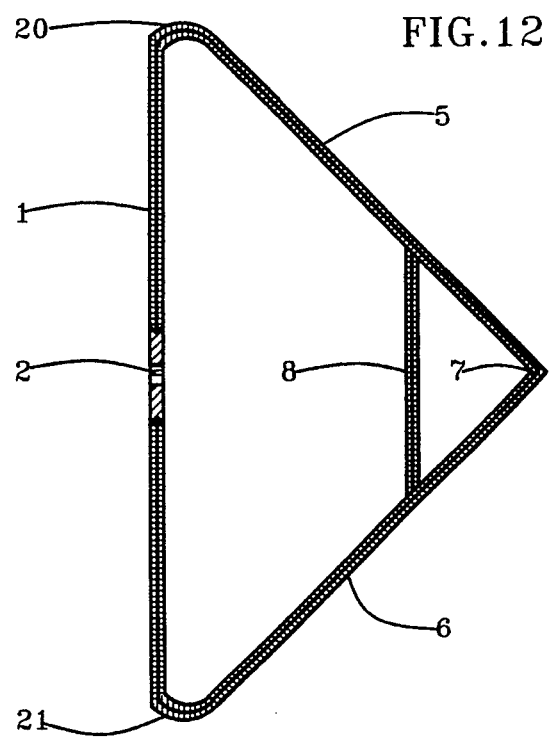
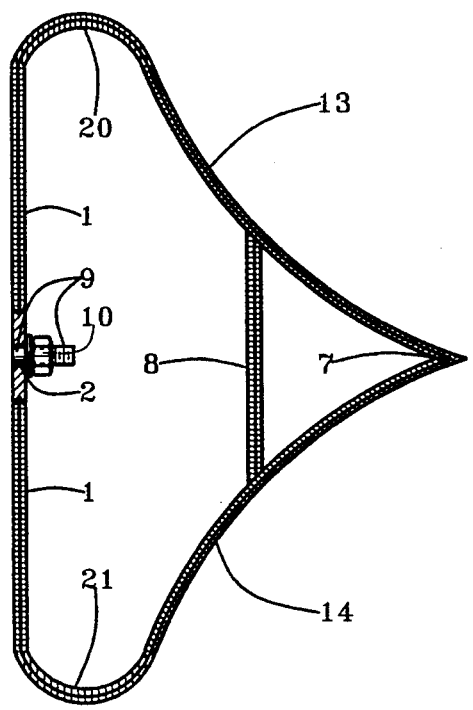
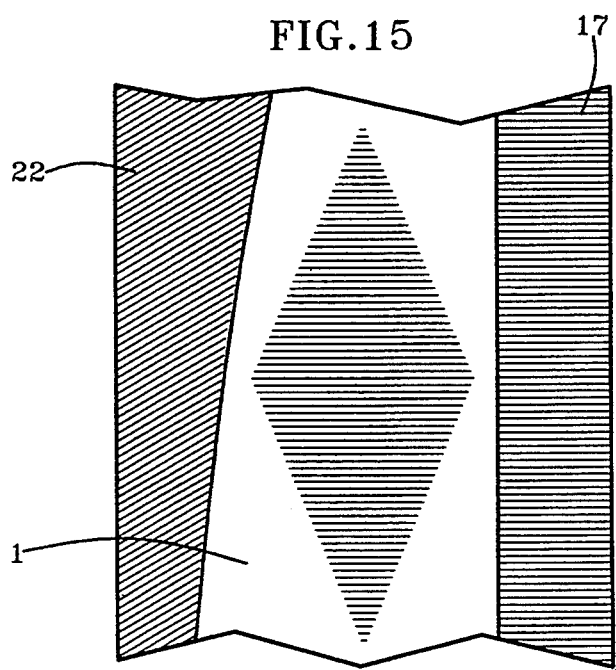

EDGING BLADES FOR CONSTRUCTING BEVELLED AND ANGLED CONTOURS FOR LANSCAPING PURPOSES

BACKGROUND OF THE INVENTION

I. Field of the Invention.

This invention relates generally to the field of cutting blades for lawn and garden edgers and in particular to a bevelled edger blade which can be attached to conventional lawn and garden edgers for cutting bevelled contours on edges of lawns, gardens and related areas.

II. Description of the Prior Art.

Conventional edgers now in common use have a rotary blade that turns on a horizontal axis like a rotary lawn mower tipped on its side. Edging channels with vertical walls are cut with conventional edgers. They are useful particularly at edges of lawns and gardens at their borders with sidewalks, walkways and at their borders with each other. Previous attempts have been made to construct edgers that cut channels with a slanted wall on one side.

This provides a clear separation of areas with a neat, trimmed appearance that also prevents mixed and uneven growth at the borders. But they have not become widely used because they are too cumbersome and do not fit conveniently onto present edgers as an option to vertical-wall edging. Now such contoured edging channels are cut manually with a shovel. Much labor time is required and the shovel-cut channel is not as neat and uniform as can be cut with this invention in a small fraction of the time.

Examples of the previous edging cutters that are different from this invention for cutting bevelled channels include U.S. Pat. No. 2,555,441 granted to Hackney. The Hackney cutter had a "frustro-conical disc" with at least two blades on a conical surface. A center of a truncated end of the frustro-conical disc was rotated on a horizontal shaft with a minor diameter or optionally a major diameter facing outward for cutting outwardly sloped or inwardly sloped edging channels respectively. Another bevelled edger is described in U.S. Pat. No. 2,664,807 granted to Hedrick. Instead of a convenient blade attachable to present edging machines, the Hedrick device was a complete vehicle with its own different mechanism for controlling depth of edging cuts, a deflector for deflecting cuttings and other features which made it impossible to use on present edging machines. Still another of the different previous bevelled edgers is described in U.S. Pat. No. 2,752,813 granted to Stoeber. The Stoeber patent was limited to a compete edging and ditching machine with a particular type of frame and a rotor to which a plurality of ditch-cutting blades were attachable. Different from the present invention, none of the known prior art is a bevelled cutting blade that can be attached conveniently to present conventional edging machines.

SUMMARY OF THE INVENTION

In accordance with the present invention, it is contemplated that the primary objective of this invention is to provide a bevelled edger blade that can be attached easily and conveniently to present edgers for cutting bevelled edges of lawns and gardens with the same edging machine that is used for straight edging as and when desired.

Another objective is to provide a bevelled-edger blade that can be used to bevel-edge long borders of large landscape areas with less time and effort than now required.

Another objective is to provide a bevelled-edger blade for contour-sloped or straight-sloped edging of landscape areas.

Another objective is to provide a bevelled-edger blade for round-bottom or corner-bottom sloping of edging channels of lawns and gardens.

Yet another objective is to provide a bevelled-edger blade with desired directional discharge of cuttings.

This invention accomplishes the above and other objectives with a three-sided edger blade having a base side attachable centrally to a conventional edger shaft. Ends of the base side having cutting edges are extended an equal distance in opposite directions from a blade axis at a central attachment orifice on the base side to base corners. An axial corner is positioned a select distance horizontally from the blade axis. Sloped edges of border channels of landscape areas are cut by cutting edges on angular sides intermediate the axial corner and the base corners on the three-sided edger blade as it is rotated by the conventional edger shaft. The angular sides can be straight for cutting straight slopes or arcuate for cutting arcuate slopes optionally. A blade brace can be positioned parallel to the base side between the angular sides. The base corners can be rounded for round-bottomed edging. Deflector surfaces on rotationally aft edges of the sides of the blade can be provided for directing flow of cuttings out of the edging channels in a desired direction for collection.

Other objects, advantages and capabilities of the invention will become apparent frown the following description taken in conjunction with the accompanying drawings showing preferred embodiments of the invention.

BRIEF DESCRIPTION OF THE DRAWINGS

FIG. 1 is a partial cutaway side view of one embodiment of the invention;

FIG. 2 is an elevation view of the FIG. 1 illustration from a direction of an edger machine to which it is attachable;

FIG. 3 is an elevation view of the FIG. 1 illustration in a direction towards an edger machine;

FIG. 4 is a partial cutaway side view of an embodiment having arcuate angular blades;

FIG. 5 is an elevation view of the FIG. 4 illustration in a direction towards an edger machine;

FIG. 6 is a cross-sectional view of a blade with one edge sharpened symmetrically;

FIG. 7 is a cross-sectional view of a blade with symmetrically sharpened double edges;

FIG. 8 is a cross-sectional view of a blade with single-bevel sharpness at both edges;

FIG. 9 is a cross-sectional view of the FIG. 7 blade at a tapered narrow end proximate an axial corner;

FIG. 10 is a cross-sectional view of the FIG. 8 blade at a tapered narrow end proximate an axial corner;

FIG. 11 is a partial cutaway elevation view of an embodiment having flat base corners and straight angular sides;

FIG. 12 is a partial cutaway elevation view of an embodiment having arcuate base corners and straight angular sides;

FIG. 13 is a partial cutaway elevation view of an embodiment having arcuate base corners and arcuate angular sides;

FIG. 14 is a cross-section view of a blade having a deflector surface on a rotationally aft portion; and FIG. 15 is a top sectional view of a blade having a deflector surface on a rotationally aft portion.

DESCRIPTION OF THE PREFERRED EMBODIMENTS

Referring to the drawings wherein like reference numerals designate corresponding parts throughout the several figures, reference is made first to FIG. 1. At least one base side 1 has opposite ends which are extended a desired equal distance from an attachment orifice 2 at an axis to a base corner 3 and an opposite base corner 4. An angular side 5 is extended from the base corner 3 and an opposite angular side 6 is extended from the opposite base corner 4 to an axial corner 7. The axial corner 7 is positioned at a select distance axially from the attachment orifice 2. A blade brace 8 can be extended between the angular sides 5 and 6 in an attitude parallel to the base side 1. There are three planar sides in a straight-walled trihedral embodiment of this bevelled edger blade. In other embodiments, arcuate corners and arcuate angular sides are trihedral in effect and function but are not geometrically trihedral.

The attachment orifice 2 can be sized and shaped to fit onto standard edger shafts 9. Usually the shafts 9 are cylindrical and require only a circular attachment orifice 2 sized for a snug fit on the edger shaft 9. Some, however, have splines and others have a key or a keyway. The attachment orifice 2 is intended to include either. Usually a simple fastener nut 10 is all that is required for attachment of this bevelled edger blade.

In operation, the edger shaft 9 is rotated to rotate the base side 1 and the angular sides 5 and 6 around the blase axis, which is defined by the axis of rotation of the shaft. The base side I cuts vertically and the angular sides 5 and 6 cut an acute angle in soil surrounding lawns and gardens as the edger is moved on wheels. Conventionally, edgers only cut straight, thin vertical lines against walkways, lawns, gardens and other landscape elements. This bevelled edger cuts a bevelled channel with a vertical wall on one side and a slanted wall on an opposite side. A bevelled channel is highly desirable for not only a groomed appearance but also for separation of different areas of vegetation and for separation of non-vegetation areas such as walkways, roadways and court areas from various vegetation areas. Now it is accomplished with grueling shovel labor. There have been other bevelled edgers, but they have been so cumbersome and expensive that professional gardeners and landscapers as well as ordinary homeowners have resorted to shovel labor instead of using them. This simple but highly effective trihedral edger blade is designed to meet this need.

Referring to FIG. 2, the base side 1 from a direction of an edger machine shows the attachment orifice 2 positioned centrally and bevelled cutting edges 11 on each side of the base side 1. Cutting edges 11 on a rotationally aft edge are optional. Cutting surfaces on side 1, angular side 5 and angular side 6 are depicted in FIG. 1 by an edge line 12 down the center of each side and shading lines suggestive of travel lines of a grinder. The same shading lines representative of grinder travel are shown in FIGS. 2, 3, 4, 5, 11, 12, 13 and 15. The blade brace 8 also is sharpened as indicated by the same edge line 12 and shading lines.

Referring to FIG. 3, the angular sides 5 and 6 are preferably tapered. From a width of the base side 1 at base corners 3 and 4, width of the angular sides 5 and 6 decrease in a direction towards the axial corner 7. Small portions of the base side 1 are shown beneath the tapered angular sides 5 and 6 in this view towards an edger machine.

Referring to FIGS. 4 and 5, arcuate angular sides 13 and 14 can be extended from the base corners 3 and 4 to the axial corner 7. Arcuate walls of landscape edging channels are cut with the arcuate angular sides 13 and 14.

This bevelled edger blade can be made in any size. A preferred size for fitting onto standard edgers in common use has a base side 1 nine inches long from opposite base corners 3 and 4. The base 1 is one and one-half inches wide and generally less than one-quarter inch thick. The attachment orifice 2 can range from three-eighths inches to three-fourths inches in diameter for standard sizes of shafts 9 and larger for larger blades. The axial corner 7 has an angle of preferably 90 degrees, leaving forty-five-degree angles at the base corners 13 and 4 for the straight-side embodiment shown in FIG. 1. The angular sides 5, 6, 13 and 14 taper to approximately three-eighth inches at the axial corner 7. The inward curvature of arcuate angular sides 13 and 14 is preferably a five-inch radius for the contour embodiment shown in FIGS. 4 and 5. The blade brace 8 is positioned approximately one and one-half inches from the axial corner 7 in parallel relationship to the base side 1.

Referring to FIGS. 6-10, sides 1, 5, 6, 13 and 14 can have a symmetrical sharp leading edge 15 as shown for a base side 1 in FIG. 6. Symmetrical double edges 16 can be provided optionally as indicated for a base side 1 in FIG. 7. Preferably for many applications, however, all of the sides of blades are sharpened with a single-bevel edge 17 as depicted in FIG. 8. As they taper towards the axial point 7, angular blades 5, 6, 13 and 14 become narrower as shown with symmetrical double edges 16 in FIG. 9 and single-bevel edges 17 in FIG. 10.

Referring to FIG. 11, squared base corner 18 and opposite squared base corner 19 can be employed for cutting square-bottom landscape channels the squared base corners being formed by truncating the apex formed by the angular sides 5 and 6 and the base side 1. Generally, these squared corners 18 and 19 would be used in conjunction with angular sides 5 and 6 which are straight.

Referring to FIG. 12, rounded or arcuate base corner 20 and opposite rounded or arcuate base corner 21 can be employed for cutting round-bottom landscape channels. Straight angular sides 5 and 6 can be used in conjunction with rounded base corners 20 and 21 also.

Referring to FIG. 13, the rounded or arcuate base corners 20 and 21 can be employed with arcuate angular sides 13 and 14 to construct what can be a one-piece blade that is welded or otherwise fastened at the axial corner 7. Any form of construction can be employed, however. This embodiment cuts contoured landscape channels with rounded bottoms.

Referring to FIGS. 14 and 15, either side of either form of blade can have a deflector surface 22 on a rotationally aft edge that is opposite a single cutting edge, preferably type 17 as shown in FIGS. 8 and 10. Side 1 is depicted to represent also sides 5, 6, 13 and 14. FIG. 15 shows the deflector surface 22 contoured along blade 1 to deflect cuttings where a catcher may be positioned on an edger or in a window as desired for collection and disposal or for scattering over a landscape surface. The deflector surface 22 also can be shaped and positioned to scatter cuttings over a landscape surface. Only a simple curve for a deflector surface 22 is shown because it can be formed differently for achieving different patterns for discharge of cuttings.

Although only one base side 1 is shown with two base corners 3, 4, 18, 19, 20 and 21, additional base sides 1 can be added with corresponding base corners for each. Generally, although not necessarily, this would be for large edgers approaching a size for ditching and furrowing. For the larger sizes, length of the base side would be longer than the typical nine inches that is preferred for standard edging. The attachment orifice would be larger and more likely the larger edger would have an edger shaft 8 with one or more splines or keyways. The base side 1 could be up to twenty inches long and the other sides 5 and 6 would be proportionately longer. A next likely size larger would have two base sides 1 at right angles to each other. Increased number of sizes would be employed to compensate for greater circumferential distances between the blades.

Various modifications may be made of the invention without departing from the scope thereof and it is desired, therefore, that only such limitations shall be placed thereon as are imposed by the prior art and which are set forth in the appended claims.

What is claimed is:

1. A bevelled edger blade comprising:
   at least one base side having opposite ends of the base side extended in opposite directions from a blade axis, the base side having an attachment orifice,
   opposite angular sides having base ends attached to and forming base corners at the opposite ends of the base side,
   an axial corner to which axial-corner ends of the angular sides are extended axially from the attachment orifice, the angular sides being tapered from a width of the base side at the base corners to a narrower width at the axial corner,
   base side cutting edges, the base side cutting edges being rotationally leading edges of the base side, and
   angular side cutting edges, the angular side cutting edges being rotationally leading edges of the angular sides.

2. A bevelled edger blade as claimed in claim 1 and further comprising:
   a blade brace having sides parallel to the base side and having opposite ends attached to the angular sides, and
   a blade brace cutting edge.

3. A bevelled edger blade as claimed in claim 1, wherein the base corners are arcuate.

4. A bevelled edger blade comprising:
   at least one base side having opposite ends of the base side extended in opposite directions from a blade axis, the base side having an attachment orifice,
   opposite angular sides having base ends attached to and forming base corners at the opposite ends of the base side,
   an axial corner to which axial-corner ends of the angular sides are extended axially from the attachment orifice, the angular sides being arcuate with an equal inward curve intermediate the base corner and the axial corner,
   base side cutting edges, the base side cutting edges being rotationally leading edges of the base side, and
   angular side cutting edges, the angular side cutting edges being rotationally leading edges of the angular sides.

5. A bevelled edger blade as claimed in claim 4 and further comprising:
   a blade brace having sides parallel to the base side and having opposite ends attached to the angular sides, and
   a blade brace cutting edge.

6. A bevelled edger blade as claimed in claim 4, wherein the base corners are arcuate.

7. A bevelled edger blade as claimed in claim 4 and further comprising deflector surfaces positioned on rotationally aft portions of sides of the bevelled edger blade and angled in a direction to discharge cuttings as desired.

8. A bevelled edger blade comprising:
   at least one base side having opposite ends of the base side extended in opposite directions from a blade axis, the base side having an attachment orifice, the base side being nine inches long and one and one-half inches wide, and the attachment orifice having an inside diameter as large as about one half of an inch and as small as about three eighths of an inch,
   opposite angular sides having base ends attached to and forming base corners at the opposite ends of the base side,
   an axial corner to which axial-corner ends of the angular sides are extended axially from the attachment orifice, the opposite angular sides being six inches long with a tapered width of one and one-half inches at the base corners and three eighths of an inch at the axial corner,
   base side cutting edges, the base side cutting edges being rotationally leading edges of the base side, and
   angular side cutting edges, the angular side cutting edges being rotationally leading edges of the angular sides.

9. A bevelled edger blade as claimed in claim 8 and further comprising:
   a blade brace having sides parallel to the base side and having opposite ends attached to the angular sides, and
   a blade brace cutting edge.

10. A bevelled edger blade as claimed in claim 9, wherein the base corners are arcuate.

11. A bevelled edger blade comprising:
    at least one base side having opposite ends of the base side extended in opposite directions from a blade axis, the base side having an attachment orifice,
    opposite angular sides having base ends attached to and forming base corners at the opposite ends of the base side,
    an axial corner to which axial-corner ends of the angular sides are extended axially from the attachment orifice,
    base side cutting edges, the base side cutting edges being rotationally leading edges of the base side,
    angular side cutting edges, the angular side cutting edges being rotationally leading edges of the angular sides, and
    deflector surfaces positioned on rotationally aft portions of the sides of the bevelled edger blade, the deflector surfaces angled in a direction to discharge cuttings.

12. A bevelled edger blade comprising:

at least one base side having opposite ends of the base side extended in opposite directions from a blade axis, the base side having an attachment orifice, opposite angular sides having base ends attached to and forming base corners at the opposite ends of the base side, an axial corner to which axial-corner ends of the angular sides are extended axially from the attachment orifice, the angular sides being tapered from a width of the base side at the base corners to a narrower width at the axial corner, base side cutting edges, the base side cutting edges being rotationally leading edges of the base side, angular side cutting edges, the angular side cutting edges being rotationally leading edges of the angular sides, and deflector surfaces positioned on rotationally aft portions of the sides of the bevelled edger blade, the deflector surfaces angled in a direction to discharge cuttings.

13. A bevelled edger blade comprising:

at least one base side having opposite ends of the base side extended in opposite directions from a blade axis, the base side having an attachment orifice, opposite angular sides having base ends attached to and forming squared base corners at the opposite ends of the base side, the squared base corners being formed by truncating the apex formed by the angular sides and the base side, an axial corner to which axial-corner ends of the angular sides are extended axially from the attachment orifice, base side cutting edges, the base side cutting edges being rotationally leading edges of the base side, and angular side cutting edges, the angular side cutting edges being rotationally leading edges of the angular sides.

* * * * *